United States Patent
Barbu et al.

(10) Patent No.: US 8,068,654 B2
(45) Date of Patent: Nov. 29, 2011

(54) METHOD AND SYSTEM FOR DETECTION AND REGISTRATION OF 3D OBJECTS USING INCREMENTAL PARAMETER LEARNING

(75) Inventors: Adrian Barbu, Tallahassee, FL (US); Le Lu, Plainsboro, NJ (US); Luca Bogoni, Philadelphia, PA (US); Marcos Salganicoff, Philadelphia, PA (US); Dorin Comaniciu, Princeton Junction, NJ (US)

(73) Assignee: Siemens Akteingesellschaft, Munich (DE)

( * ) Notice: Subject to any disclaimer, the term of this patent is extended or adjusted under 35 U.S.C. 154(b) by 930 days.

(21) Appl. No.: 12/012,386

(22) Filed: Feb. 1, 2008

(65) Prior Publication Data
US 2008/0211812 A1 Sep. 4, 2008

Related U.S. Application Data

(60) Provisional application No. 60/887,895, filed on Feb. 2, 2007.

(51) Int. Cl.
*G06K 9/00* (2006.01)
*G06T 15/00* (2011.01)
(52) U.S. Cl. .................. 382/131; 382/154; 345/419
(58) Field of Classification Search .......... 382/128–132, 382/154, 285; 345/419–427; 356/12–14; 348/42–60
See application file for complete search history.

(56) References Cited

U.S. PATENT DOCUMENTS

| | | | |
|---|---|---|---|
| 6,496,184 B1 * | 12/2002 | Freeman et al. | 345/419 |
| 6,829,384 B2 | 12/2004 | Schneiderman et al. | |
| 7,308,134 B2 | 12/2007 | Wersing et al. | |
| 7,809,177 B2 * | 10/2010 | Yoshida et al. | 382/128 |
| 2002/0159627 A1 | 10/2002 | Schneiderman et al. | |
| 2002/0165837 A1 | 11/2002 | Zhang et al. | |
| 2003/0035573 A1 | 2/2003 | Duta et al. | |
| 2006/0074834 A1 | 4/2006 | Dong et al. | |
| 2006/0110029 A1 | 5/2006 | Kazui et al. | |
| 2006/0224539 A1 | 10/2006 | Zhang et al. | |
| 2007/0036429 A1 | 2/2007 | Terakawa | |
| 2007/0073114 A1 | 3/2007 | Gundel | |
| 2007/0140541 A1 | 6/2007 | Bae et al. | |
| 2008/0005180 A1 | 1/2008 | Kunze | |
| 2008/0085050 A1 * | 4/2008 | Barbu et al. | 382/154 |
| 2008/0211812 A1 * | 9/2008 | Barbu et al. | 345/424 |
| 2009/0304251 A1 * | 12/2009 | Zheng et al. | 382/131 |
| 2010/0040272 A1 * | 2/2010 | Zheng et al. | 382/131 |
| 2010/0067764 A1 * | 3/2010 | Lu et al. | 382/131 |
| 2010/0074499 A1 * | 3/2010 | Wels et al. | 382/131 |
| 2010/0080434 A1 * | 4/2010 | Seifert et al. | 382/131 |
| 2010/0142787 A1 * | 6/2010 | Zheng et al. | 382/131 |
| 2011/0063288 A1 * | 3/2011 | Valadez | 345/419 |

* cited by examiner

*Primary Examiner* — Aaron W Carter

(57) ABSTRACT

A method and system for detecting 3D objects in images is disclosed. In particular, a method and system for Ileo-Cecal Valve detection in 3D computed tomography (CT) images using incremental parameter learning and ICV specific prior learning is disclosed. First, second, and third classifiers are sequentially trained to detect candidates for position, scale, and orientation parameters of a box that bounds an object in 3D image. In the training of each sequential classifier, new training samples are generated by scanning the object's configuration parameters in the current learning projected subspace (position, scale, orientation), based on detected candidates resulting from the previous training step. This allows simultaneous detection and registration of a 3D object with full 9 degrees of freedom. ICV specific prior learning can be used to detect candidate voxels for an orifice of the ICV and to detect initial ICV box candidates using a constrained orientation alignment at each candidate voxel.

7 Claims, 6 Drawing Sheets

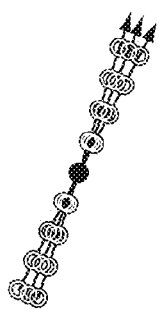
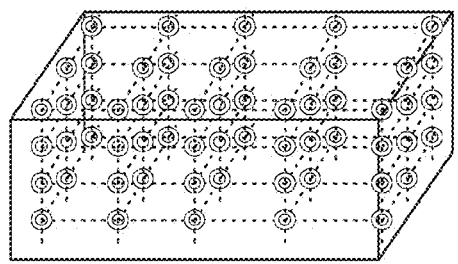
FIG. 4A                FIG. 4B
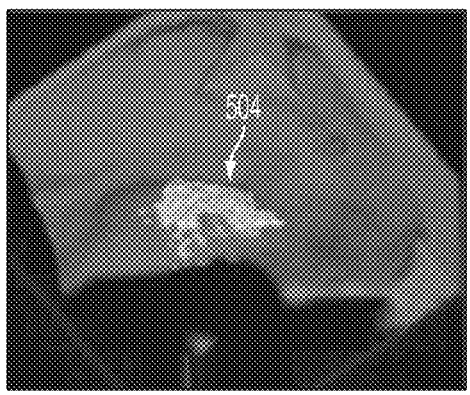
FIG. 5A                FIG. 5B

METHOD AND SYSTEM FOR DETECTION AND REGISTRATION OF 3D OBJECTS USING INCREMENTAL PARAMETER LEARNING

This application claims the benefit of U.S. Provisional Application No. 60/887,895, filed Feb. 2, 2007, the disclosure of which is herein incorporated by reference.

BACKGROUND OF THE INVENTION

The present invention relates 3D object detection in images, and more particularly, to automated Ileo-Cecal Valve (ICV) detection in colon CT data using incremental parameter learning.

Detecting and segmenting human anatomic structures in 3D medical image volumes (e.g., CT, MRI, etc.) is a challenging problem, which is typically more difficult than detecting anatomic structures in 2D images. Human anatomic structures are highly deformable by nature, leading to large intra-class variation in the shape, appearance, and pose (orientation) of such structures in 3D medical images. Furthermore, the pose of an anatomic structure is typically unknown in advance of detection. If the pose of an anatomic structure were known prior to detection, it would be possible to train a model for the same category of anatomic structure with a fixed pose specification and pre-align all testing data with the known pose information to evaluate their fitness against the learned model. However, in order to determine the pose configuration of an anatomic structure, the structure itself must be first detected, because pose estimation is only meaningful where the structure exists. Accordingly, a method for simultaneous detection and registration of 3D anatomic structures is need.

Many three dimensional (3D) detection and segmentation problems are confronted with searching in a high dimensional space. For example, a 3D similarity transformation is characterized by nine parameters: three position parameters, three orientation parameters, and three scale parameters. It is very expensive to search the entire space for detection of an object. The search for all these parameters becomes computationally prohibitive, even if coarse-to-fine strategies are involved.

The Ileo-Cecal Valve (ICV) is a small anatomic structure connecting the small and large intestines in the human body. The normal functionality of the ICV (opening and closing on demand) allows food to pass into the large intestine (i.e., colon) from the small intestine. The ICV being stuck in either the open or closed position can cause serious medical consequences. Furthermore, detecting the ICV in 3D computed tomography (CT) volumes is important for accurate colon segmentation and for distinguishing false positives from polyps in colon cancer diagnosis. The size of the ICV is sensitive to the weight of the patient and whether the ICV is healthy or diseased. Because the ICV is part of the colon, which is highly deformable, the position and orientation of the ICV can vary greatly. Due to large variations in the position, size, and orientation of the ICV, detecting the ICV in CT volumes can be very difficult. Accordingly, a method for automatically detecting the size, position, and orientation of the ICV is needed.

BRIEF SUMMARY OF THE INVENTION

The present invention addresses 3D object detection in images. Embodiments of the present invention are directed to automatic Ileo-Cecal Valve (ICV) detection in 3D computed tomography (CT) images. The detection method of the present invention allows full 9 degrees-of-freedom (DOF) of searching to locate object with optimal configurations (3D for translation, 3D for rotation, and 3D for scale).

In one embodiment of the present invention, an incremental parameter learning method is used for ICV detection in 3D CT volumes. A 3D training CT volume is received. A first classifier is trained which generates a number of ICV position box candidates for the 3D training CT volume from a set of initial ICV box candidates. A second classifier is trained which generates a number of ICV position and scale box candidates for the 3D training CT volume from the classifier-verified ICV position box candidates. A third classifier is trained which detects a position, scale, and orientation of a 3D box bounding the ICV in the 3D training volume from the classifier-verified ICV position and scale box candidates. An orifice classifier can also be trained which generates a number of orifice candidate surface voxels from the 3D training CT volume, and an initial orientation classifier can be trained which generates the set of initial ICV box candidates from the orifice candidate voxels.

In another embodiment of the present invention, ICV detection in a 3D CT image can be performed by detecting initial box candidates for the ICV based an ICV orifice, and detecting a box bounding the ICV in the 3D CT volume by sequentially detecting possible locations, scales, and orientations of the box bounding the ICV using incremental parameter learning based on the initial box candidates. In order to detect the initial box candidates, a number of ICV orifice candidate voxels can be detected in the 3D CT volume using a trained 3D point detector. An orientation of a 3D box centered at each orifice candidate voxel can be aligned with a gradient vector at that orifice candidate voxel, and testing boxes can be generated by rotating the orientation of the 3D box centered at each orifice candidate voxel inside the orthogonal plane of the corresponding gradient vector. A number of the testing boxes can be detected as initial box candidates using a trained 3D box detector. In order to detect of the box bounding the ICV using incremental parameter learning, first testing boxes can be generated by shifting a center location of each initial box candidate and a number of first testing boxes can be detected as ICV position box candidates using a first trained classifier. Second testing boxes can be generated by varying a scale of each ICV position box candidate, and a number of second testing boxes can be detected as ICV position and scale box candidates using a second trained classifier. Third testing boxes can be generated by adding disturbances to an orientation of each ICV position and scale box candidate, and one of the third testing boxes can be detected as the box bounding the ICV in the 3D CT volume.

These and other advantages of the invention will be apparent to those of ordinary skill in the art by reference to the following detailed description and the accompanying drawings.

BRIEF DESCRIPTION OF THE DRAWINGS

FIGS. 4A and 4B illustrate steerable patterns for ICV detection according to an embodiment of the present invention;

FIGS. 5A and 5B illustrate an example of ICV orifice detection;

DETAILED DESCRIPTION

The present invention is directed to a method for 3D object detection and registration in images. A particular embodiment of the present invention is directed to Ileo-Cecal Valve (ICV) detection in computed tomography (CT) image volumes. Embodiments of the present invention are described herein to give a visual understanding of the ICV detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

According to an embodiment of the present invention, incremental parameter learning is used for simultaneous detection and registration of a 3D object in a 3D image (e.g., CT image, MRI image, etc.). Incremental parameter learning is based on a sequence of binary encodings of projected true positives from labeled objects in a set of training data. That is, global optima in the global space are enforced to be projected optima in the corresponding projection subspaces for each parameter via encoding. The encoding is performed using an iterative learning method. At each step of encoding, new object samples are extracted by scanning the object's configuration parameter in the current learning subspace, based on the detected candidate hypotheses from the preceding step. The distances from extracted samples to their corresponding spatially labeled objects (as ground truth to be learned) are then utilized to separate these training samples into positive and negative sets. This ensures that the projection of the global optima be optima in each subspace during training, so that the projections of global optima can be sequentially detected through the subspaces in testing, and finally the global optima can be recovered as a result. This process is repeated until the full object configuration parameter spaces are explored. The encoding process can be binary classification problem, which can be implemented using a probabilistic boosting tree (PBT) algorithm.

Figure 1:
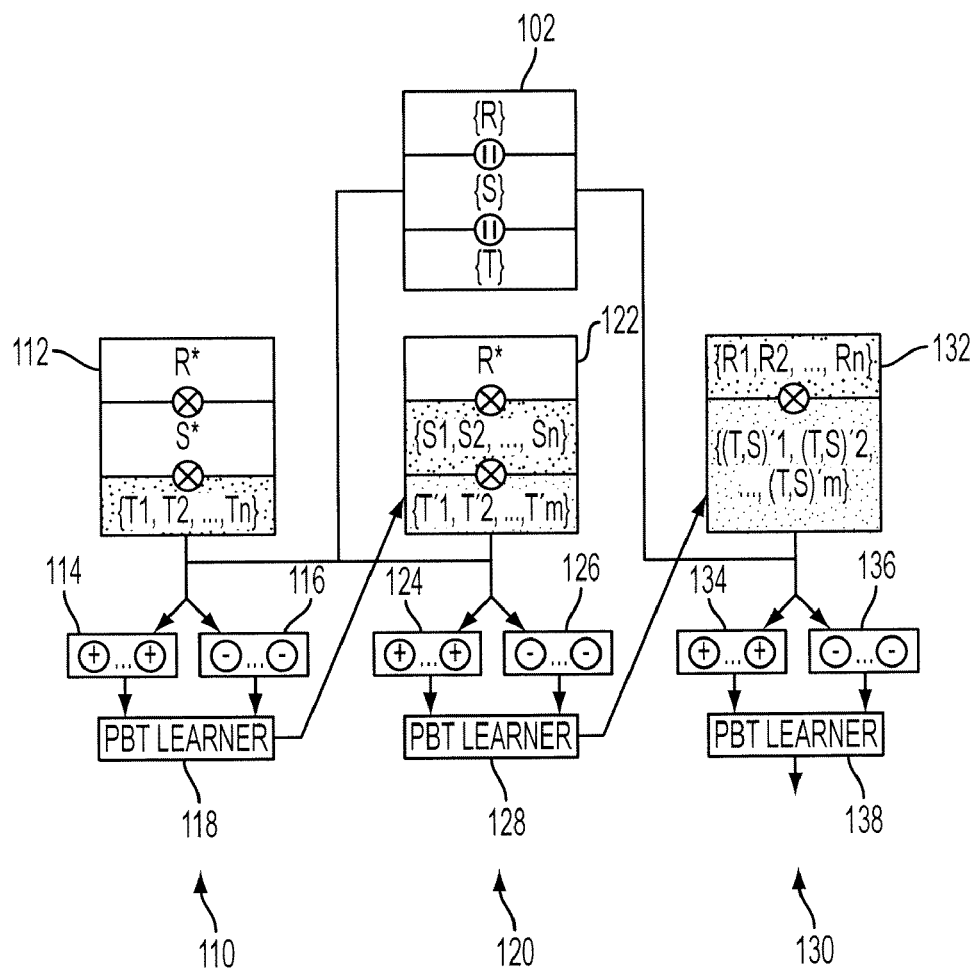
FIG. 1 illustrates a framework for an incremental learning method for detecting a 3D object according to an embodiment of the present invention.

FIG. 1 illustrates a framework for an incremental parameter learning method for detecting a 3D object according to an embodiment of the present invention. As illustrated in FIG. 1, the parameter box 102 represents the ground truth for the position, size, and orientation of a 3D object, which is known from labeled training data. Boxes 112, 122, and 132 show how the spatial parameters of the object are incrementally from translation (112), scale (122), to rotation (132). ‖ means one-to-one corresponding parameter augmentation, and × means Cartesian product in $\Omega_T$, $\Omega_S$, and $\Omega_R$ parameter spaces. The detection of a 3D object is defined herein as finding a 3D bounding box in a 3D data volume that includes the object as closely as possible. The object's (or the box's) spatial configuration space $\Omega$ can be uniquely determined by its 3D center position ($\Omega_T$), 3D size ($\Omega_S$), and 3D orientation (rotation angles $\Omega_R$). However, directed searching (i.e., scanning and verifying) in this 9D space is infeasible due to the prohibitive computational expense. The 9D parameter searching or learning method of the present invention is performed in three 3D steps of location finding ($\Omega_T$) (110), followed by size adjustment ($\Omega_S$) (120) and orientation estimation ($\Omega_R$) (130). In greater detail, the following incremental parameter subspaces are formulated:

$$\Omega_1:\{\Omega_T\} \subset \Omega_2:\{\Omega_T, \Omega_S\} \subset \Omega_3:\{\Omega_T, \Omega_S, \Omega_R\} \quad (1)$$

where $\Omega_3 = \Omega$, or more generally $$\Omega_1 \subset \Omega_2 \subset \ldots \subset \Omega_n = \Omega \quad (2)$$

In equations (1) and (2), the order of $\Omega_S$ and $\Omega_R$ can be switched, but $\Omega_T$ should be the first parameter learned. This is because the object's size and orientation can be only be optimized at a location at which the object is found.

For training, a set of 3D objects are labeled in training data volumes with bounding boxes {T, S, R}. This set of 3D objects is represented by parameter box 102 in FIG. 1 as ground truth. Without loss of generality, it can be assumed that there is only one true object in each 3D data volume. At step 110, $\Omega_T$ is searched by scanning n samples $\{T_1, T_2, \ldots, T_n\}$ around the true object positions {T} of each data volume of the training data with the parameters $\Omega_S$ and $\Omega_R$ set to the mean values S* and R* of {S} and {R}, respectively. This is shown at box 112 of FIG. 1. The distances dist(($T_i$, S*, R*), ($T_t$, $S_t$, $R_t$)), i=1, 2, . . . , n are then calculated between each of the sampled box candidates {($T_1$, S*, R*); ($T_2$, S*, R*); . . . ; ($T_n$, S*, R*)} in a data volume and the labeled box ($T_t$, $S_t$, $R_t$), which is the corresponding ground truth in the same data volume. The translation distance metric dist(($T_i$, S*, R*), ($T_t$, $S_t$, $R_t$)) is computer as the center-to-center Euclidean distance:

$$\text{dist}((T_i, S^*, R^*), (T_t, S_t, R_t)) = \|C_i - C_t\| \quad (3)$$

where $C_i$ is the geometrical center of the sampling box ($T_i$, S*, R*) and $C_t$ is the geometrical center of the ground truth box ($T_t$, $S_t$, $R_t$).

The box samples {($T_1$, S*, R*); ($T_2$, S*, R*); . . . ; ($T_n$, S*, R*)} for each data volume are then divided into a positive training set $\Phi_T^+$ (114) or a negative training set $\Phi_T^-$ (116) based on the distance metric dist((T, S*, R*), ($T_t$, $S_t$, $R_t$)). In particular, the box samples {($T_1$, S*, R*); ($T_2$, S*, R*); . . . ; ($T_n$, S*, R*)} are divided into the positive training set $\Phi_T^+$ (114) if $$\text{dist}((T_i, S^*, R^*), (T_t, S_t, R_t)) < \theta_1 \quad (4)$$

and the negative training set $\Phi_T^-$ (116) if $$\text{dist}((T_i, S^*, R^*), (T_t, S_t, R_t)) > \theta_2 \quad (5)$$

where $\theta_2 > \theta_1$.

The positive training set $\Phi_T^+$ (114) and the negative training set $\Phi_T^-$ (116) are used by a boosting based probabilistic binary learner 118, such as a probabilistic boosting tree (PBT), to train a first classifier $P_T$. Steerable features are calculated from each 3D bounding box and its corresponding data volume for the PBT training. Based on the steerable features, the first classifier $P_T$ can determine a probability for sampled (in training) or scanned (in testing) object boxes. The first classifier $P_T$ determines higher positive-class probability values (close to 1) for boxes which are close to their respective labeled object boxes and lower values (close to 0) for boxes that are distant from their respective labeled object boxes. Once the first classifier $P_T$ is trained, the first classifier $P_T$ is used to classify the sampled box candidates {($T_1$, S*, R*); ($T_2$, S*, R*); . . . ; ($T_n$, S*, R*)}, and the top M candidates are retained as {($T_1'$, S*, R*); ($T_2'$, S*, R*); . . . ; ($T_m'$, S*, R*)} with the highest output probabilities. If there is only one existing object per volume and the training function is perfectly learned by a classifier, M=1 is sufficient to achieve the correct detection. In practice, it is possible to set M=50~100 for all intermediate detection steps to improve robustness. Accordingly, multiple detected hypotheses can be maintained until the final result.

The M intermediate detections (candidates) resulting from the first classifier $P_T$ are used as a basis for step 120. At step 120, each candidate $(T_i', S^*, R^*)$, i=1, 2, ..., M is augmented as n samples: $\{(T_i', S_1, R^*); (T_i', S_2, R^*); ...; (T_i', S_n, R^*)\}$. Accordingly, for each candidate $(T_i', S^*, R^*)$, i=1, 2, ..., M, $\Omega_S$ is searched by scanning n samples for the size, while the orientation parameter $\Omega_R$ is set to the means value R*. This is shown at box 122 of FIG. 1. This results in M×n box candidates being obtained. The box candidates are divided into a positive training set $\Phi_S^+$ (124) if $$\text{dist}((T_i', S_j, R^*), (T_t', S_t, R_t)) < \tau_1 \qquad (6)$$

and a negative training set $\Phi_S^-$ (126) if $$\text{dist}((T_i', S_j, R^*), (T_t', S_t, R_t)) > \tau_2 \qquad (7)$$

for i=1, 2, ..., M and j=1, 2, ..., n. $\text{dist}((T_i', S_j, R^*), (T_t', S_t, R_t))$ is defined as a box-to-box distance function which formulates 3D box differences in both $\Omega_T$ and $\Omega_S$. More generally, such a box-to-box distance function can be expressed as:

$$\text{dist}(box_1, box_2) = \sum_{i=1,2,...8} \{\|v_1^i - v_2^i\|\}/8 \qquad (8)$$

where $v_1^i$ is one of eight vertices of $box_1$ and $v_2^i$ is the corresponding vertex of $box_2$. $\|v_1^i - v_2^i\|$ is the Euclidean distance between two 3D vectors $v_1^i$ and $v_2^i$.

The positive training set $\Phi_S^+$ (124) and the negative training set $\Phi_S^-$ (126) are used by PBT learner 128 to train a second classifier $P_S$, based on steerable features that are calculated from each of the candidate boxes. Once the second classifier $P_S$ is trained, the second classifier $P_S$ is used to classify the M×n box candidates $\{(T_i', S_j, R^*)\}$, i=1, 2, ..., M; j=1, 2, ..., n, and the top M candidates with the highest output probabilities are retained. These candidates are denoted as $\{(T_i', S_i', R^*)\}$ i=1, 2, ..., M.

The M intermediate detections (candidates) resulting from the second classifier $P_s$ are used as a basis for step 130. At step 130, each candidate $(T_i', S_i', R_j)$, i=1, 2, ..., M is further expanded in $\Omega_R$ by scanning n samples for the orientation for each candidate, resulting in M×n box candidates $\{(T_i', S_i', R_j)\}$, i=1, 2, ..., M; j=1, 2, ..., n. This is shown at box 132 of FIG. 1. As in, step 120, box-to-box distance is used with distance thresholds $\lambda_2$ and $\lambda_2$ to divide the box candidates into a positive training set $\Phi_R^+$ (134) and a negative training set $\Phi_R^-$ (136). The positive training set $\Phi_R^+$ (134) and the negative training set $\Phi_R^-$ (136) are used by PBT learner 138 to train a third classifier $P_R$, based on steerable features that are calculated from each of the candidate boxes. Once the third classifier $P_R$ is trained, the third classifier $P_R$ can be used to classify the M×n box candidates $\{(T_i', S_i', R_j)\}$, i=1, 2, ..., M; j=1, 2, ..., n, and output the top M candidates: $\{(T_k', S_k', R_k')\}$, k=1, 2, ..., M, which are the object detection results of multiple hypotheses. Accordingly, the box candidate with the highest output probability from the third classifier $P_R$ for a data volume is the most likely parameter configuration for the 3D object in the data volume.

In testing, three searching steps are used to sequentially search in $\Omega_T$, $\Omega_S$, and $\Omega_R$ in order to detect the 3D object in an unlabeled data volume. In each step, 3D box candidates which are close to the global optimum (i.e., the objects true spatial configuration) can be scanned and searched in the current parameter subspace $(\Omega_T \to \Omega_S \to \Omega_R)$, using the learned models (classifiers) $P_T$, $P_S$, and $P_R$, respectively. The output candidates are used as seeds of propagation in the next stage of the incremental parameter optimization, and the testing leads to the optimized spatial configuration of the 3D object in the data volume.

Figure 2A:
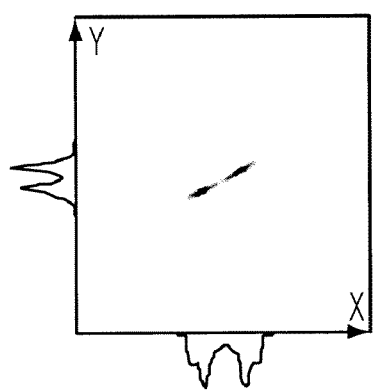
FIGS. 2A and 2B illustrate two particular cases of incremental parameter learning.
Figure 2B:
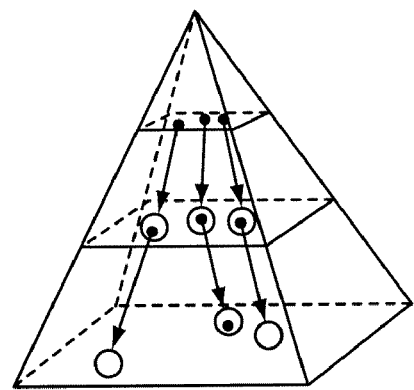

FIGS. 2A and 2B illustrate two particular cases of incremental parameter learning. As illustrated FIG. 2A, finding of global optima in 2D can be sped up by exploring optima in the x-axis, then searching in the y-axis with constrained values of x. There is no general guarantee that the global optima are also optimal in each decomposed coordinates. However, in the present invention, the response functions of the incremental parameter space projections are supervisedly learned, which largely maintains global optimality. FIG. 2B illustrates a hierarchical search for object detection in multi-resolution 2D/3D images. As illustrated FIG. 2B, to improve computational efficiency, only the neighboring candidates in the current resolution, propagated from the few coarser-level positive detections, are searched for the object.

Figure 3:
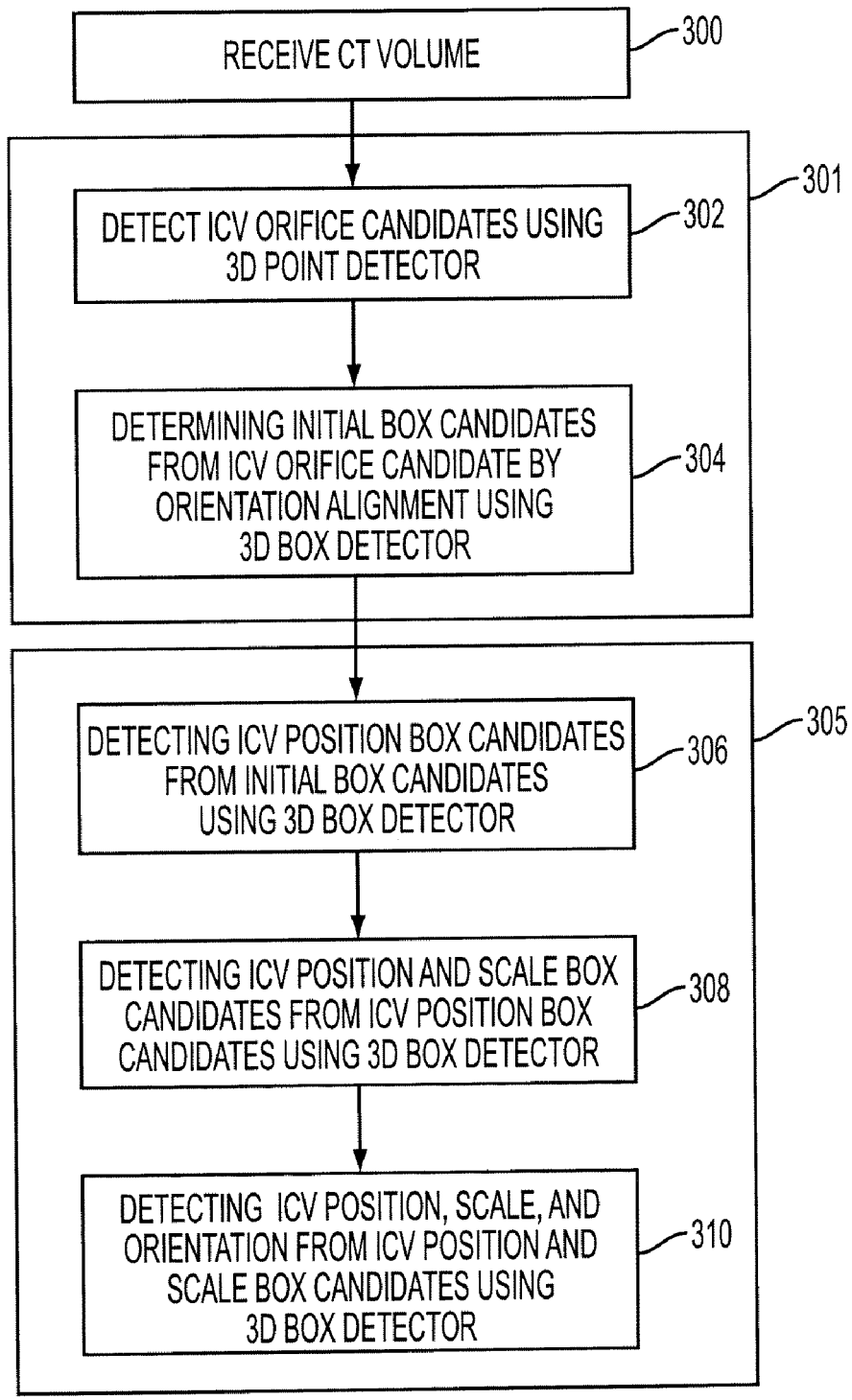
FIG. 3 illustrates a method of detecting the Ileo-Cecal Valve (ICV) a 3D computed tomography (CT) volume using general incremental parameter learning and specific prior learning according to an embodiment of the present invention.

FIG. 3 illustrates a method of detecting the Ileo-Cecal Valve (ICV) a 3D CT volume using incremental parameter learning according to an embodiment of the present invention. The method of FIG. 3 uses steerable features for training classifiers for detecting the ICV in a 3D CT volume. In steerable features, only a sampling grid-pattern needs to be translated, rotated, and re-scaled instead of the data volume itself. This allows fast 3D data evaluation and is effective for the object detection steps of the method of FIG. 3. The sampling pattern used herein models global object-level features. According to one implementation, the sampling pattern is composed by a number of sampling grids/points where 71 local intensity, gradient, and curvature features are computed at each grid.

FIGS. 4A and 4B illustrate steerable patterns for ICV detection according to an embodiment of the present invention. FIG. 4A is an axis-based pattern for detecting an orifice of the ICV. Assuming that the sampling pattern is placed with its center grid at a certain voxel v, the axis-based sampling pattern contains three sampling axes as the gradient directions averages in v's neighborhoods under three scales, respectively. Along each axis, nine grids are evenly sampled. This process is repeated for halfly and quarterly down-sampled CT volumes as well. Altogether, this results in M=81=3×9×3 grid nodes, which brings 71×81=5751 features. FIG. 4B is a box-based pattern which is evenly fit with 7×7×5 sampling grids. The total feature number for the box-based sampling pattern is 52185, which can be determined by integrating features from three different scales. A classifier trained using the axis pattern and PBT is referred to herein as a 3D point detector, while a classifier trained using the box pattern and PBT is referred to herein as a 3D box detector.

The ICV detection method of detects the spatial configuration (i.e., center position, scale, and orientation) of a 3D box bounding the ICV in a CT volume. Referring to FIG. 3, at step 300 a CT volume is received. The CT volume can be received directly from an image acquisition device, or can be received by loading a CT volume stored in memory or storage of a computer system. The CT volume can be used for training or testing. CT volumes used for training can be annotated. The ICV detection method can be divided into two stages. Stage 301 utilizes prior knowledge regarding the ICV to generate initial box candidates. Stage 301 includes steps 302 and 304. Stage 305 uses incremental parameter learning for sequentially detecting the position, scale, and orientation of the ICV in the CT volume based on the initial box candidates. Stage 305 includes steps 306, 308, and 310.

At step 302, candidate points are detected for an orifice of the ICV using a 3D point detector. The orifice is part of the anatomy of the ICV. If the ICV's orifice can be found, its position in $\Omega_T$ will be well-constrained where no exhaustive searching of position is need. The ICV orifice has a distinct shape profile which allows efficient detection using a 3D point detector. As described above, a 3D point detector involves less feature computation (5751 vs. 52185 for training) than a 3D box detector for direct ICV detection. Furthermore, it is known that the ICV orifice only lies on the colon surface. Thus, it is possible to prune all voxel locations inside the tissue or in the air for faster scanning. FIGS. 5A and 5B illustrate an example of the orifice sampling pattern and orifice detection. FIG. 5A shows the ICV orifice sampling pattern 502 used to train the 3D box detector based on steerable features. FIG. 5B shows orifice candidate voxels 504 detected using the 3D point detector, which is trained based on the sampling pattern 502 and PBT. In order to train the 3D point detector for detecting ICV orifice candidates, based on annotated orifice locations in a training CT volume set, positive training samples are generated for surface voxels within $\alpha_1$ voxel distance and negative training samples are generated for surface voxels farther than $\alpha_2$ voxel distance. It can be set that $\alpha_2 > \alpha_1$, so that the discriminative boosting training will not focus on sample distances between $\alpha_1$ and $\alpha_2$, which are ambiguous for classifier training and unimportant for target finding. The trained classifier $P_O$ is used to exhaustively scan all surface voxels, to prune the voxel such that only a predetermined number of ICV orifice candidates are preserved for a particular CT volume.

Returning to FIG. 3, at step 304, initial box candidates are detected from the ICV orifice candidates by orientation alignment using a 3D box detector. For each ICV orifice candidate, an ICV bounding box is centered at that location, with a mean size estimated from the annotated training CT volumes. In the local 3D coordinates of an ICV box, the XY plane can be assumed to be aligned with the gradient vector of the orifice as its Z-axis. This is an important domain knowledge that can be used to initially prune ICV's orientation space $\Omega_R$ in degrees of freedom (DOF). Boxes are then rotated around the Z-axis with 10 degree intervals to generate training samples for training the 3D box detector. Based on their box-to-box distances from the ground truth ICV box and distance thresholds $\beta_1$ and $\beta_2$, positive and negative training sets are generated by distance thresholding. A PBT classifier $P_{R'}$ (3D box detector) is then trained using the box-level steerable features, as shown in FIG. 4B. The training examples are then evaluated using the trained classifier $P_{R'}$, and a predetermined number of top candidates having the highest probabilities are maintained for a particular volume. According to possible implementations of the present invention steps 302 and 304 can be implemented with distance thresholds of $\alpha_1=4$ voxels, $\alpha_2=20$ voxels, $\beta_1=6$ voxels, and $\beta_2=30$ voxels, but the present invention is not limited thereto.

Stage 305 of the method of FIG. 3 refers to incremental parameter learning, in which more accurate estimates of ICV position, scale, and orientation parameter configurations are detected. The box-level steerable features, as shown in FIG. 4B, and PBT classifier are used for each step (306, 308, and 310) of stage 305. Step 304 results in a number of initial box candidates per volume with their positions and orientations pruned as described in steps 302 and 304. The initial box candidates are used in the incremental parameter learning to sequentially detect the position, scale, and orientation ($\Omega_T \rightarrow \Omega_S \rightarrow \Omega_R$) of the ICV.

At step 306, ICV position box candidates are detected from the initial box candidates using a 3D box detector. In order to detect the position box candidates, the position of each of the initial box candidates can be shifted to every one voxel in a range, such as [−20,20], of all X, Y, and Z coordinates (i.e., $\Omega_T + \Delta_T$). This set of synthesized ICV box samples is then split into positive ($<\theta_1$) and negative ($>\theta_2$) training sets for the PBT training the first classifier $P_T$ using distance thresholding. For example, the distance thresholds $\theta_1$ and $\theta_2$ can be implemented as $\theta_1=5$ voxels and $\theta_2=25$ voxels, but the present invention is not limited thereto. The classifier $P_T$ is then trained using PBT based on the box-level steerable features, and used to classify the ICB box samples generated for each initial box candidate. The top M (e.g., 100) candidates in each CT volume are maintained as the ICV position box candidates.

At step 308, ICV position and scale box candidates are detected from the ICV position box candidates using a 3D box detector. The size parameter of each ICV position box candidate resulting from step 306 is varied evenly in $\Omega_S$ to generate box samples for each ICV position box candidate. For example, the size parameter can be varied evenly by 2 voxel intervals from the range of [23,51] voxels in the X direction, [15,33] voxels in the Y direction, and [11,31] voxels in the Z direction. The ranges can be statistically calculated from the annotated ICV dataset. Using the box-level steerable features and PBT, the second classifier Ps is trained using distance thresholding. For example distance thresholds of $\tau_1=4$ and $\tau_2=20$ can be used, but the present invention is not limited thereto. The second classifier $P_S$ is used to classify the generated box samples, and the top M are maintained as the ICV position and scale candidates.

At step 310, the position, scale, and orientation of the ICV is detected from the ICV position and scale box candidates using a 3D box detector. In this step, box samples are generated by adaptively adding disturbances to the previously aligned (in step 304) orientation parameters of the ICV position and scale box candidates (i.e., $\Omega_R + \Delta_R$). For example, $\Delta_R$ can vary with 0.05 intervals in [−0.3,0.3], 0.1 in ([−0.9,−0.3), (0.3,0.9]) and 0.3 in ([−1.8,−0.9), (0.9,1.8]). This provides a finer scale of searching when closer to the current orientation parameters (retained from $P_{R'}$ in step 304), to improve the $\Omega_R$ detection accuracy. Distance thresholding is used to divide the box samples into positive and negative training sets. For example, distance thresholds of $\eta_1=4$ and $\eta_2=15$ can be used, but the present invention is not limited thereto. The third classifier $P_R$ is then trained using the box-level steerable features and PBT, and $P_R$ is used to classify the generated box samples. The box candidate (sample) with the highest probability value form $P_R$ is output as the final ICV detection result. Accordingly, the 9D spatial configuration (position, scale, and orientation) of a box bounding the ICV is given by the position, scale, and orientation parameters of the final ICV detection result.

The ICV detection result can be output by storing the detection result on memory or storage of a computer system, displaying the detection result on an image of the CT volume, etc. The ICV detection can be used to reduce false positives in colon polyp detection. For example, the ICV detection result can be used as a post filter for a colon polyp classification system.

Figure 6A:
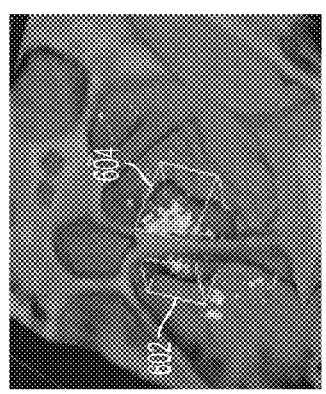
FIGS. 6A-6H illustrate exemplary results of ICV detection using the method FIG. 3.
Figure 6B:
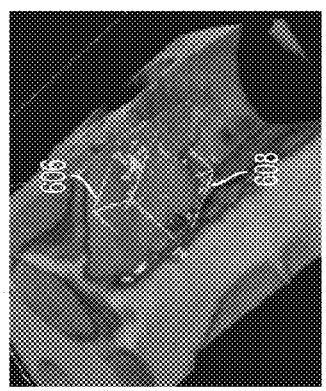
Figure 6C:
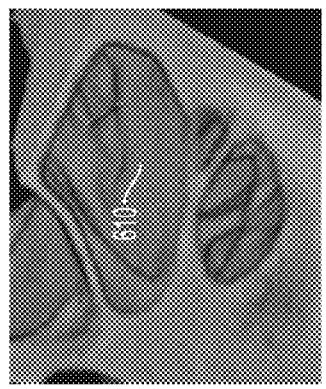
Figure 6D:
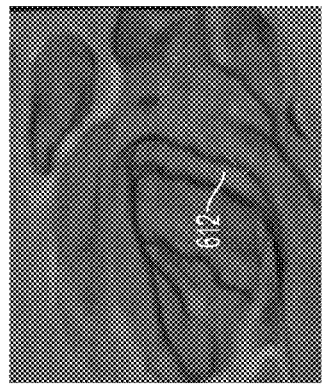
Figure 6E:
Figure 6F:
Figure 6G:
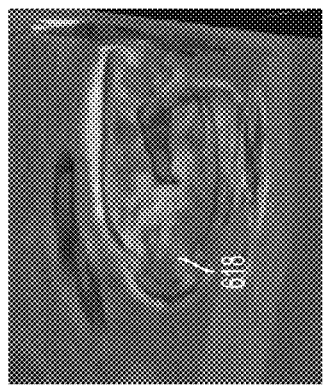
Figure 6H:
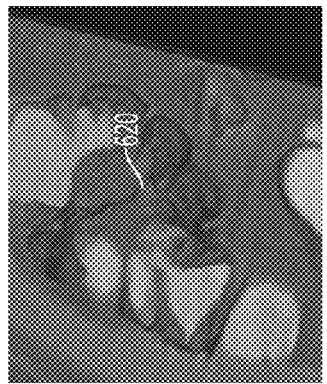

FIGS. 6A-6B illustrate exemplary results of ICV detection using the method FIG. 3. FIGS. 6A and 6B illustrate ICV detection results in annotated CT images from two viewpoints. As illustrated in FIGS. 6A and 6B, boxes 602 and 606 show the detection results and boxes 604 and 608 show the annotations. FIGS. 6C, 6D, and 6E show ICV detection results 610, 612, and 614 from unseen clean colon CT volumes. FIG. 6F shows ICV detection results 616 from an unseen solid tagged colon CT volume. FIGS. 6G. and 6H show ICV detection results 618 and 620 from unseen liquid tagged colon CT volumes.

Figure 7:
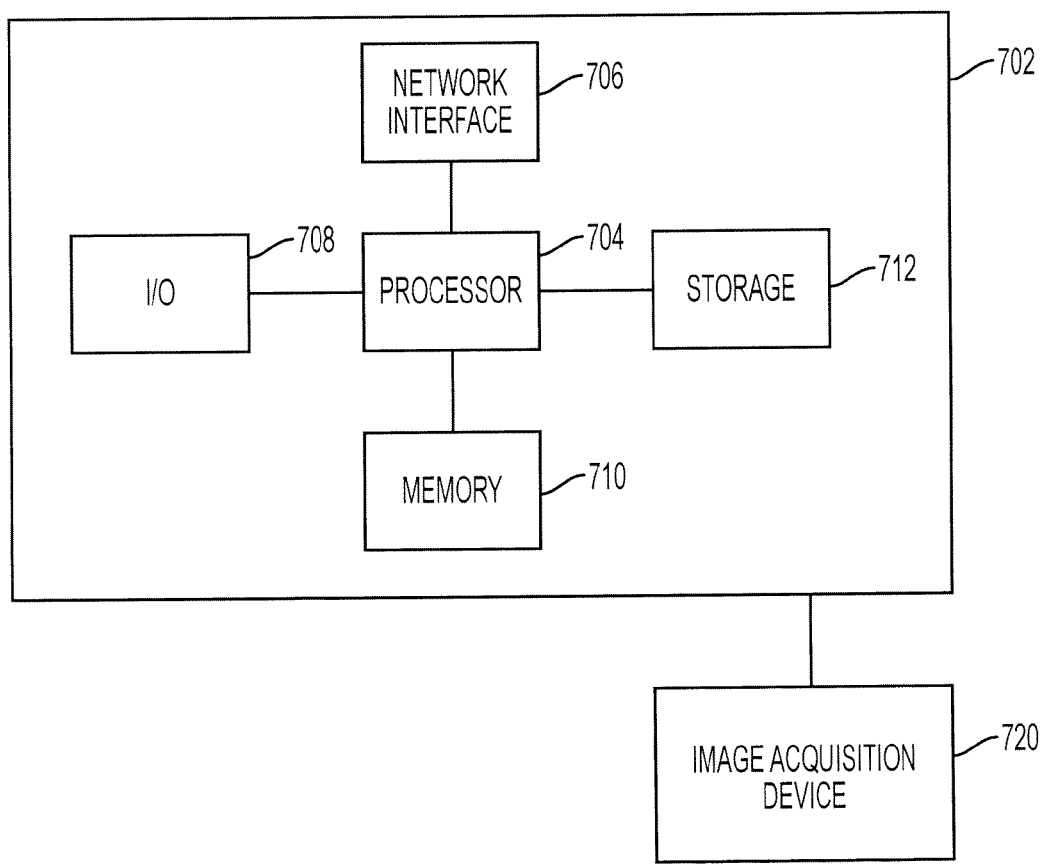
FIG. 7 is a high level block diagram of a computer capable of implementing the present invention.

The above-described methods for 3D object detection, and in particular, ICV detection in CT volumes, may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the method of FIG. 3, as well as the architecture of FIG. 1 may be defined by the computer program instructions stored in the memory 710 and/or storage 712 and controlled by the processor 704 executing the computer program instructions. Furthermore, the classifiers trained by the above described methods and the diction results achieved by the above described methods can be stored in the memory 710 and/or storage 712. An image acquisition device 720, such as a CT scanning device, can be connected to the computer 702 to input the 3D images (volumes) to the computer 702. It is possible to implement the image acquisition device 720 and the computer 702 as one device. It is also possible that the image acquisition device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for Ileo-Cecal Valve (ICV) detection in an input 3D computed tomography (CT) volume, comprising:
   detecting initial box candidates for the ICV based on an ICV orifice in said input 3D CT volume; and
   detecting a box bounding the ICV in said 3D CT volume by sequentially detecting possible locations, scales, and orientations of the box bounding the ICV using incremental parameter learning based on said initial box candidates.

2. The method of claim 1, wherein said step of detecting initial box candidates for the ICV comprises:
   detecting a number of ICV orifice candidate voxels in said 3D CT volume using a trained 3D point detector;
   aligning an orientation of a 3D box centered at each orifice candidate voxel with a gradient vector at that orifice candidate voxel, wherein a scale of each 3D box is fixed;
   generating a set testing boxes by rotating the orientation of the 3D box centered at each orifice candidate voxel; and
   detecting a number of said testing boxes as initial box candidates using a trained 3D box detector.

3. The method of claim 1, wherein said step of detecting a box bounding the ICV in said 3D CT volume comprises:
   generating a plurality of first testing boxes by shifting a center location of each of said initial box candidates;
   detecting a number of said first testing boxes as ICV position box candidates using a first trained classifier;
   generating a plurality of second testing boxes by varying a scale of each of said ICV position box candidates;
   detecting a number of said second testing boxes as ICV position and scale box candidates using a second trained classifier;
   generating a plurality of third testing boxes by adding disturbances to an orientation of each of said ICV position and scale box candidates; and
   detecting one of said third testing boxes as the box bounding the ICV in said 3D CT volume.

4. The method of claim 3, wherein each of said first, second, and third trained classifiers is trained using a probabilistic boosting tree using steerable features.

5. An apparatus for Ileo-Cecal Valve (ICV) detection in an input 3D computed tomography (CT) volume, comprising:
   means for detecting initial box candidates for the ICV based on an ICV orifice in said input 3D CT volume; and
   means for detecting a box bounding the ICV in said 3D CT volume by sequentially detecting possible locations, scales, and orientations of the box bounding the ICV using incremental parameter learning based on said initial box candidates.

6. The apparatus of claim 5, wherein said means for detecting initial box candidates for the ICV comprises:
   means for detecting a number of ICV orifice candidate voxels in said 3D CT volume using a trained 3D point detector;
   means for aligning an orientation of a 3D box centered at each orifice candidate voxel with a gradient vector at that orifice candidate voxel, wherein a scale of each 3D box is fixed;
   means for generating a set testing boxes by rotating the orientation of the 3D box centered at each orifice candidate voxel; and
   means for detecting a number of said testing boxes as initial box candidates using a trained 3D box detector.

7. The apparatus of claim 5, wherein said means for detecting a box bounding the ICV in said 3D CT volume comprises:

means for generating a plurality of first testing boxes by shifting a center location of each of said initial box candidates;

means for detecting a number of said first testing boxes as ICV position box candidates using a first trained classifier;

means for generating a plurality of second testing boxes by varying a scale of each of said ICV position box candidates;

means for detecting a number of said second testing boxes as ICV position and scale box candidates using a second trained classifier;

means for generating a plurality of third testing boxes by adding disturbances to an orientation of each of said ICV position and scale box candidates; and means for detecting one of said third testing boxes as the box bounding the ICV in said 3D CT volume.

* * * * *